July 1, 1941.                A. S. HAISLIP                2,247,612
                              CAMP STOVE
                           Filed Jan. 7, 1939           3 Sheets-Sheet 2
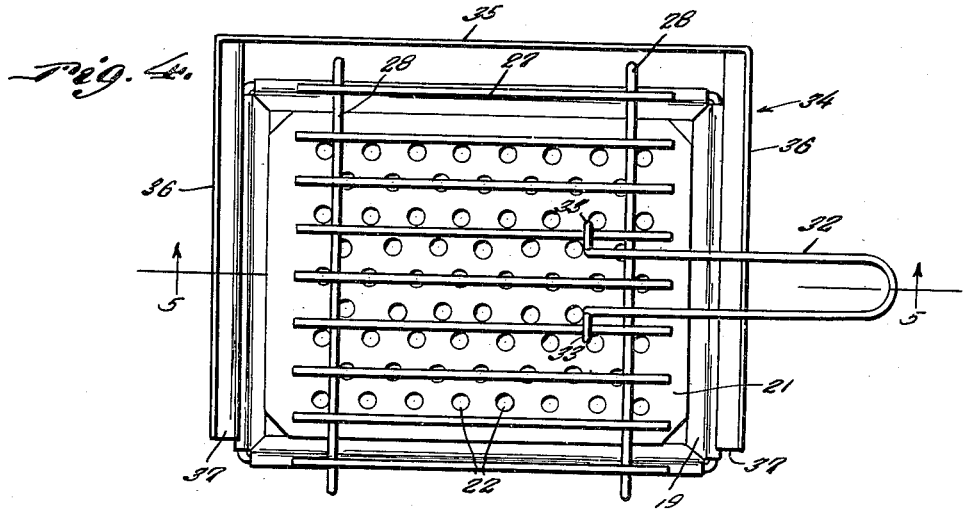
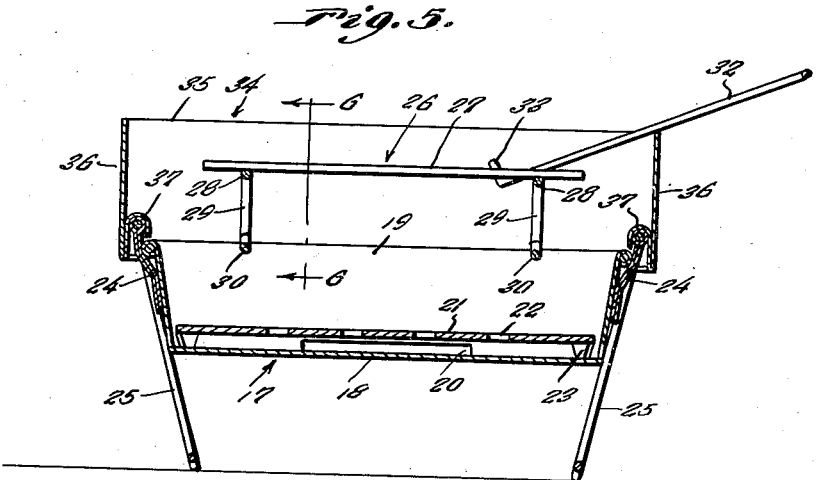
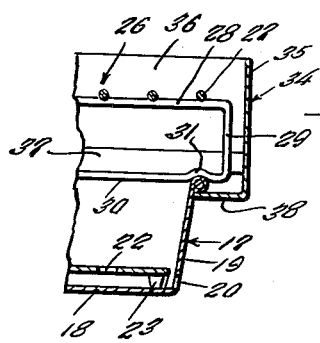
Inventor
A. S. Haislip
By Clarence A. O'Brien
and Hyman Berman
                                    Attorneys July 1, 1941.  A. S. HAISLIP  2,247,612
CAMP STOVE
Filed Jan. 7, 1939   3 Sheets-Sheet 3

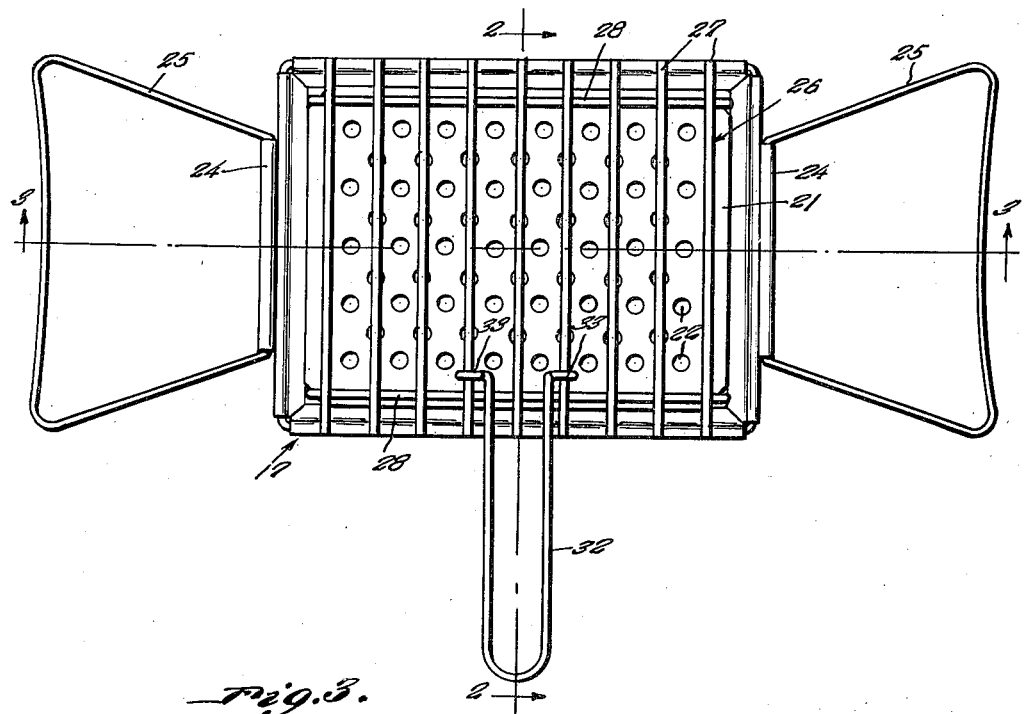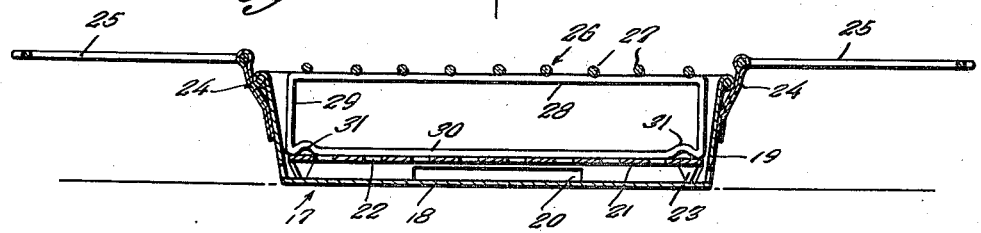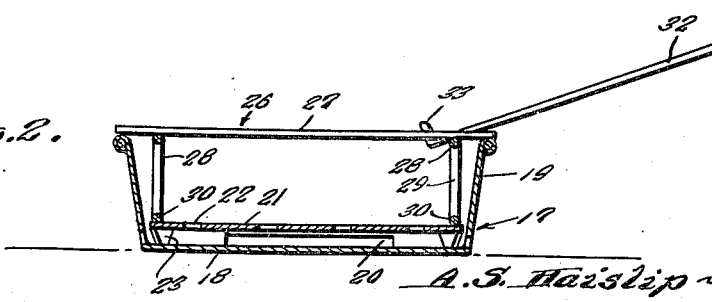

Inventor
A. S. Haislip
By Clarence A. O'Brien
and Hyman Berman
Attorneys

Patented July 1, 1941

2,247,612

UNITED STATES PATENT OFFICE 2,247,612

CAMP STOVE

Albert S. Haislip, Fredericksburg, Va., assignor of one-half to F. W. Feuerherd, Fredericksburg, Va.

Application January 7, 1939, Serial No. 249,815

12 Claims. (Cl. 126—25)

This invention relates to a novel and improved camp stove of the portable variety, which is especially, but not necessarily, adapted for use by tourists and campers, anglers and others desirous of possessing and using a simplified and economical structure possessed of unusual compactness and convenience.

To some extent I am reasonably conversant with the general state of the prior art to which the invention relates. In fact, I have recently filed and secured the allowance of an application for somewhat similar subject matter referred to as a portable camp stove, filed January 29, 1938 and identified as Serial No. 187,768 which matured into Patent No. 2,158,236 dated May 16, 1939.

Briefly, the stove referred to above is characterized by an open top casing adapted to contain and house a predetermined source of heat such as shavings, coke or charcoal, the casing being in the form of a relatively deep cylindrical container and embodying an imperforate bottom and an upstanding apertured marginal wall. Usable with the casing is a utensil supporting and cooking grille unit detachably and adjustably associated therewith, the unit having guide and retention means depending telescopically into the casing and further including an open-work utensil supporting grille or grid member. The unit is also provided with a folding handle and this is hingedly attached to the marginal portion of the grille and projectable laterally beyond the wall of the casing when in use and swingable into overlapping relation with the grille when it is not in use.

Encountering packaging facilities and manufacturing obstacles susceptible of rendering the structure readily marketable, I have discovered the need for certain changes and refinements. Therefore the improved structure constituting the subject matter of this application is similar to that above defined but is different to the extent that it includes a shallow pan which serves as the container or casing, the shallow pan being provided with bail-like supporting legs, and the grille unit being differently constructed so that it may occupy a receding position in the pan or an elevated position above the rim of the pan when used for such cooking purposes as requires elevating the grille unit to a predetermined and safe height above the source of heat.

In reducing to practice the now preferred and improved form of the invention I have introduced several distinguishable adaptations. That is to say, the grille unit is comparatively different in that it comprises a series of parallel grid rods welded to rectangular frame members, the latter serving as guiding and retention means as well as the means for shifting the grille unit from a receding position in the pan to an elevated cross-wise position above the pan.

A further feature is thought to reside in the modification comprising a simple shallow pan with an apertured bottom having fixtures for attaching wire bails to the ends of the pan, the bails serving as carrying handles as well as lifting and supporting leg members.

Other features and advantages will become more readily apparent from the following description and the accompanying illustrative drawings.

In the drawings, wherein like numerals are employed to designate like parts throughout the views;

Figure 1 is a top plan view of the camp stove as constructed in accordance with the principles and improvements serving to individualize the structure as a whole, the supporting legs being shown as swung out and the lifting handle for the grille unit extended.

Figure 2 is a central vertical cross section on the line 2—2 of Figure 1.

Figure 3 is a central longitudinal section at right angles to Figure 2, the section being on the line 3—3 of Figure 1.

Figure 4 is a top plan view of the stove set up for use, the grille unit being in a lifted or elevated position transverse to the pan, and the structure including what may be called a detachable U-shaped shield.

Figure 5 is a longitudinal central section on the plane of the line 5—5 of Figure 4 looking in the direction of the arrow.

Figure 6 is a fragmentary detail view taken on the vertical line 6—6 of Figure 5.

Figure 9:
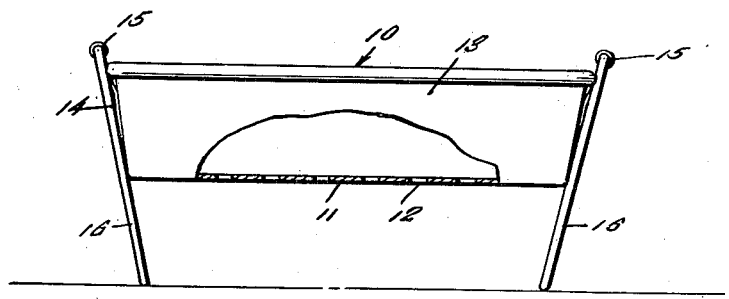
Figure 9 is an elevational view with a portion broken away and shown in section disclosing what may be described as a simplified modification of the invention.

Merely as a matter of convenience, attention is first invited to the simple camp stove illustrated in Figure 9. This comprises a simple, economical rectangular shallow pan or casing 10. The bottom 11 is provided with a plurality of draft openings 12. The side walls providing the rim 13 are inclined. The end inclined walls are provided with brackets 14 having knuckles or rolled portions 15 to accommodate the adjacent connected and hinged portions of the leg frame 16. The leg frames may serve as carrying bails as is obvious. When the structure is set up for use they incline or converge into such relationship that they effectively serve to support the pan in elevated position above the ground or other support for the structure. This is a complete stove in itself. That is to say, the fire is simply built in the pan and the weight of the pan plus that of the fire serves to cause the bottom portion of the pan to rest in contact with the intermediate portions of the leg frames 16 to facilitate maintaining the same in supporting position.

Figure 7:
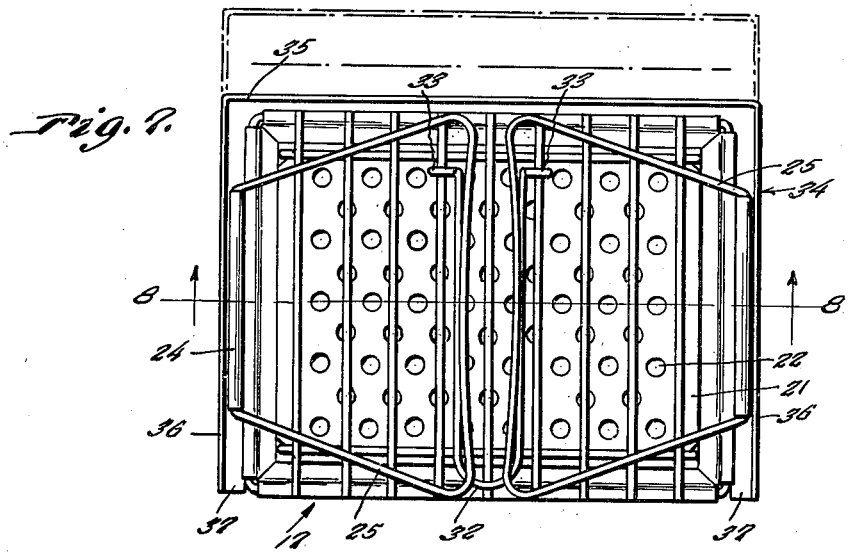
Figure 7 is a top plan view like Figure 4 showing the shield member in place and illustrating the bail-like leg frame and handle member in folded or retracted position.

In the other more complicated style or form of the invention the rectangular shallow pan is differentiated by the numeral 17. In this form the bottom 18 is imperforate while the flaring walls forming the rim 19 are provided with draft or air circulating slots 20. In this arrangement I employ a grate, this comprising a plate 21 having apertures 22 and provided at its corners with short supporting legs or feet 23. This provides a free circulation of air between the imperforate bottom and the perforated grate. The fire is of course, built on the grate. In practice the fire cartridge (not shown) is sold with the material in readiness for convenient placement in the pan. That is to say, the package contains shavings and compressed coal dust in block form, or coke, as the conditions require. Incidentally, the complete package can be placed in the pan and all of the parts folded as shown in Figure 7 for convenient carrying and subsequent use.

In this arrangement the end brackets 24 are formed with extensions projecting above the upper edges of the rim to accommodate the pivoted or hinged members of the bail-like leg frames 25.

I next call attention to what is conveniently described as the grille or grid unit 26. This is preferably made from wire and includes a plurality of companion parallel wires or rods 27, these being welded at their opposite ends to the upper wire members 28 of a pair of duplicate substantially rectangular frame members 29. The lower bar members 30 are provided with bends 31 which function as seats or keepers to rest on the longitudinal side walls of the rim of the pan as shown for example in Figures 4 and 5. The grille unit is of a length substantially equal to the internal area of the pan. Normally it sits down in the pan in what may be called a receding or retracted position as shown in Figure 2. This places the grille rod directly above the rim in the pan and at this time the grille unit is especially useful to support a coffee pot or similar utensil requiring intense heat for cooking. When it is desired to keep the coffee warm, or to use the grille unit for toasting bread or roasting frankfurters, the grille unit is lifted up and turned around through approximately 90 degrees whereupon the hump-like bends 31 rest on the opposed longitudinal walls of the pan. To facilitate handling the grille unit it is provided with a substantially V-shaped slide handle 32. The side limbs of the handle are provided with right angularly bent eyes 33 slidable on an adjacent set of grille rods 27. This allows the handle to be extended or retracted as illustrated in the drawings. In Figure 7 it is shown retracted in an out-of-the-way superimposed position, while in Figures 4 and 5 it is shown extended to a lifting and using position. In the latter position the limbs rest on the adjacent frame member 29 and this provides the desired co-action of parts.

Figure 8:
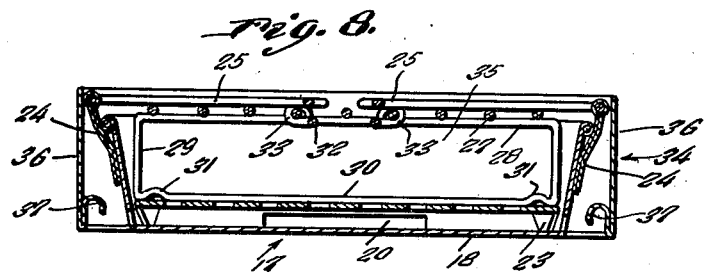
Figure 8 is a longitudinal central section on the line 8—8 of Figure 7.

On windy days it is sometimes desirable to provide a U-shaped shield unit 34. This comprises a sheet metal structure including a connective wall 35 and a pair of parallel end walls 36. The end walls have their lower ends provided with inturned hook-like flanges 37 and these slip over the adjacent projecting end portions of the aforementioned brackets 24 (see Figures 4 and 5 in particular). The same idea is brought out to advantage in Figure 6 where it will be observed that the central or connective wall 35 has a laterally directed auxiliary shielding flange 38 calculated to facilitate maintaining the shield in its usable position. The shield can be quickly detached to encompass the pan shown in Figure 8 when all of the parts are folded. Incidentally, as before stated, the leg members 25 serve as carrying bails as brought out to advantage in Figure 1. They may be tilted down into converging relation for supporting purposes. Or they may be swung inwardly toward each other and over the grille into the folded out-of-the-way position illustrated to advantage in Figures 7 and 8.

As compared to known art and the aforementioned copending application, novelty is predicated upon several distinct features. That is to say, the simple shallow pan with the foldable supporting legs in Figure 9 is believed to be an independent improvement. Then too, the other form of the pan which has an imperforate bottom with apertured side walls and a removable grate and supporting legs is a noteworthy feature. Emphasis is also directed to the slidable handle-equipped grille unit and the special supporting frames or legs which serve in both of the positions seen in Figures 3 and 4 respectively. Furthermore, novelty may be predicated, it is believed, on the detachable shield unit 34, this serving as a heat confining member as well as a wind-shield.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A camp stove of the class described comprising a relatively shallow pan having an imperforate rim and a perforated bottom, brackets secured to the end walls, a pair of bail-like leg frames hingedly attached to the brackets, said leg frames being of an equal length and the combined length thereof when folded over the top of the pan being equal to the length of the pan, the rim of the pan being inclined and the legs being swingable downwardly into converging relationship with the pan resting on the intermediate portions of the thus converging leg frames to facilitate holding the leg frames in supporting position.

2. As a component part of a camp stove assembly of the class described, a relatively shallow rectangular pan having an imperforate bottom and an inclined marginal rim, the walls forming said rim being provided with air vents, a pair of brackets secured to the opposite end walls of the rim and projecting above the upper edges of said walls, a pair of duplicate leg frames hingedly attached to the projecting ends of said brackets, said leg frames being adapted to tow in beneath the bottom of the pan when in pan-supporting relationship, the leg frames being further foldable over the open top of the pan when in an out-of-the-way transporting or carrying position.

3. As a component part of a camp stove assembly of the class described, a relatively shallow rectangular pan having an imperforate bottom and an inclined marginal rim, the walls forming said rim being provided with air vents, a pair of brackets secured to the opposite end walls of the rim and projecting above the upper edges of said walls, a pair of duplicate leg frames hingedly attached to the projecting ends of said brackets, said leg frames being adapted to tow in beneath the bottom of the pan when in pan-supporting relationship, the leg frames being further foldable over the open top of the pan when in an out-of-the-way transporting or carrying position, a grate plate in said pan having supporting feet and occupying a position parallel to the imperforate bottom, and an insertable and removable grille unit including parallel horizontally disposable grille rods and assembling and supporting members therefor.

4. As a component part of a camp stove assembly of the class described, a relatively shallow rectangular pan having an imperforate bottom and an inclined marginal rim, the walls forming said rim being provided with air vents, a pair of brackets secured to the opposite end walls of the rim and projecting above the upper edges of said walls, a pair of duplicate leg frames hingedly attached to the projecting ends of said brackets, said leg frames being adapted to tow in beneath the bottom of the pan when in pan-supporting relationship, the leg frames being further foldable over the open top of the pan when in an out-of-the-way transporting or carrying position, a grate plate in said pan having supporting feet and occupying a position parallel to the imperforate bottom, and an insertable and removable grille unit including parallel horizontally disposable grille rods and assembling and supporting members therefor, the assembling and supporting members having indentations forming keeper bends and said bends being adapted to rest on the upper edges of the longitudinal walls of the rim whereby to enable the grille unit to be supported in an elevated position above the open top of the pan.

5. A camp stove of the class described comprising a receptacle having foldable supporting legs, and a U-shaped shield unit detachably mounted on said receptacle, together with an insertable and removable grille unit, said grille unit comprising parallel wires and rectangular frame members assembling the wires, the frame members constituting retention elements, said elements being adapted to project into the receptacle when the grille unit is in receding position and being adapted to bridge the open top of the receptacle when the grille unit is elevated.

6. A portable camp stove of the class described comprising a relatively shallow pan having a bottom and an inclined marginal rim, a pair of bail-like leg frames hingedly attached to the upper edge portions of the opposite end walls of said rim, said leg frames being swingable downwardly into converging relationship with a portion of the weight of the pan resting on the intermediate portions thereof to facilitate holding the legs in supporting position and to effectively balance and support the pan from the self-sustaining converging relationship of said leg frames.

7. A portable camp stove of the class described comprising a receptacle adapted to contain and house a source of heat, and a detachable bodily insertable and removable utensil supporting and cooking grille unit, said grille unit comprising a main grille member and supporting leg members therefor, the leg members being of a height equal to the depth of the receptacle and being adapted to rest on the bottom of the receptacle to dispose the main grille unit flush with the open top of the receptacle when said grille unit is inserted in the receptacle, said leg members being adapted to rest on the top edges of the rim of the receptacle when the grille unit is lifted bodily from the receptacle, whereby to support said grille unit in an elevated projected and roasting position.

8. In a camp stove construction of the class described, an open top receptacle adapted to contain and house a predetermined source of heat, and a utensil supporting and cooking grille unit detachably and adjustably associated with said receptacle, said grille unit including a grille member proper and supporting legs therefor, said legs being adapted to project into the receptacle when the grille member is in a lowered retracted position, said legs being adapted to engage on the upper portion of the receptacle when the grille unit is in a plane spaced above the open top of said receptacle, and a lifting and lowering handle of a projectable and retractable type mounted on said grille unit whereby to permit it to be projected beyond the marginal portion of the unit or moved to a retracted position and confined within the marginal limits of said unit when not in use.

9. A camp stove of the class described comprising a receptacle having supporting legs, a bodily insertable and removable grille unit comprising a grille member proper of an area substantially equal to the open top of said receptacle, said grille unit including supporting legs and being manually and bodily liftable to an elevated position above the open top of the receptacle in which position said legs rest removably on the top edges of the rim of the receptacle, and a shield unit detachably mounted on the rim of the receptacle, said shield unit being of a height greater than the height of the grille unit to surround the grille unit when the latter is in the aforementioned elevated position.

10. A portable camp stove of the class described comprising an open-top receptacle adapted to contain and house a predetermined source of heat, an independent utensil-supporting and cooking grille unit including an open-work grid frame having rigid depending legs, said legs being adapted to rest removably on the upper portion of said receptacle to position said grid frame in an elevated position relatively remote from and above the source of heat, and said legs being also adapted to be wholly disengaged from the receptacle and lowered to occupy accommodating positions in relation to the upper portion of the receptacle so as to shift the grid frame to its lowermost position substantially in a plane with the top portion of said recepacle, whereby to dispose the same above but closer to the source of heat, and a lifting and lowering handle of a projectable and retractable type mounted on said grid frame to expedite handling the latter and to facilitate raising and lowering the same in relation to the receptacle.

11. A portable camp stove of the class described comprising an open-top receptacle adapted to contain and house a predetermined source of heat, an independent utensil-supporting and cooking grille unit including an open-work grid frame having rigid depending legs, said legs being adapted to rest removably on the upper portion of said receptacle to position said grid frame in an elevated position relatively remote from and above the source of heat, and said legs being also adapted to be wholly disengaged from the receptacle and lowered to occupy accommodating positions in relation to the upper portion of the receptacle so as to shift the grid frame to its lowermost position substantially in a plane with the top portion of said receptacle, whereby to dispose the same above but closer to the source of heat, and a handle mounted on said grid frame to expedite handling the latter and to facilitate raising and lowering the same in relation to the receptacle.

12. A portable camp stove of the class described comprising a hollow base adapted to contain and house a predetermined source of heat, a utensil-supporting and cooking grille unit including an open-work grid frame having supporting legs, said legs being adapted to rest removably on the upper portion of said base to position said grid frame in an elevated position relatively remote from and above the source of heat, and said legs being adapted also to be wholly disengaged from the receptacle and lowered to occupy accommodating positions in relation to the upper portion of the base so as to shift the grid frame from its aforementioned elevated position to its lowermost position substantially in a plane with the top of said base, whereby to dispose the same above but closer to the source of heat, and a handle carried by said grid frame to expedite handling the latter and to facilitate raising and lowering the same in relation to said upper portion of the base.

ALBERT S. HAISLIP.